(12) United States Patent
Rogson

(10) Patent No.: US 6,918,086 B2
(45) Date of Patent: Jul. 12, 2005

(54) METHOD AND APPARATUS FOR UPDATING DATABASE OF AUTOMATIC SPELLING CORRECTIONS

(76) Inventor: Ariel S. Rogson, 15045 SW. Royalty Pkwy., L33, Tigard, OR (US) 97224

( * ) Notice: Subject to any disclaimer, the term of this patent is extended or adjusted under 35 U.S.C. 154(b) by 0 days.

(21) Appl. No.: 09/537,965

(22) Filed: Mar. 28, 2000

(65) Prior Publication Data

US 2002/0010726 A1 Jan. 24, 2002

(51) Int. Cl.[7] .............................................. G06F 17/24
(52) U.S. Cl. ....................................................... 715/533
(58) Field of Search ................................ 715/533, 530, 715/531, 532

(56) References Cited

U.S. PATENT DOCUMENTS

| | | | | |
|---|---|---|---|---|
| 5,649,222 A | * | 7/1997 | Mogilevsky | 715/533 |
| 5,754,737 A | * | 5/1998 | Gipson | 706/11 |
| 5,765,180 A | * | 6/1998 | Travis | 715/533 |
| 5,787,451 A | * | 7/1998 | Mogilevsky | 715/533 |
| 5,875,443 A | * | 2/1999 | Nielsen | 707/2 |
| 5,940,847 A | * | 8/1999 | Fein et al. | 715/540 |
| 5,970,492 A | * | 10/1999 | Nielsen | 707/10 |
| 6,044,387 A | * | 3/2000 | Angiulo et al. | 715/533 |
| 6,047,300 A | * | 4/2000 | Walfish et al. | 715/533 |

OTHER PUBLICATIONS

Microsoft Corporation, "Screenshot of the AutoCorrect dialog box from Microsoft Word 97", 1997, p. 1.
Jerry Joyce and Marianne Moon, "Microsoft Word 97 At a Glance", 1997, pp. 18, 46 and 281.

* cited by examiner

Primary Examiner—Heather R. Herndon
Assistant Examiner—Doug Hutton
(74) Attorney, Agent, or Firm—Marger Johnson & McCollom, PC

(57) ABSTRACT

When the user enters a word in a document, the word is parsed. If the word is misspelled, a static update list is checked to see if the misspelled word has an automatic correction. If the word is not in the static update list and the user corrects the misspelling, the misspelled word and the correction are both captured in a list. If the user corrects the misspelling a sufficient number of times, the static update list can itself be dynamically updated to recognize the correction regularly entered by the user.

24 Claims, 14 Drawing Sheets

| 905 | | |
|---|---|---|
| ⋮ | | |
| availabel | available | 6 |
| copmany | company | 8 |
| comptuer | computer | 2 |
| ⋮ | | |

Maximum Count: | 10 |

FIG. 9A

METHOD AND APPARATUS FOR UPDATING DATABASE OF AUTOMATIC SPELLING CORRECTIONS

FIELD OF THE INVENTION

This invention pertains to spell checking on a computer and more particularly to automatically updating the wordlist of spelling corrections to automatically correct in a document.

BACKGROUND OF THE INVENTION

Over the years since computers first entered popular society, computers have given users the ability to do tasks more quickly and efficiently. One very early application of computers was for editing and printing documents. Before computers, documents were typed on typewriters. Correcting such documents required using a dictionary to identify spelling errors, and documents would then have to be re-typed. Computers with word processing or editing software enabled documents to be changed and re-printed without the user having to re-type the document.

Early on, software companies realized the advantages of providing electronic dictionaries, to save users the effort of having to use manual dictionaries. But users had to manually invoke the spell checking component of the editor. Eventually, software companies added automatic spell checking to their editing programs. Automatic spell checking uses a static update list to let users know about misspelled words immediately, without having to run the spell checker.

FIG. 1 is a flowchart of automatic spell checking as it is used in the prior art, as exemplified by the AutoCorrect in Microsoft® Word and the QuickCorrect tool in Corel® WordPerfect®. (Microsoft is a registered trademark of Microsoft Corporation in the United States and/or other countries. Corel and WordPerfect are registered trademarks of Corel Corporation or Corel Corporation Limited.) At step 105, a newly entered word is parsed. At step 110, the word is checked to see if it is misspelled. If the entered word is misspelled, at step 115 the static update list is checked to see if the word is listed. If the misspelled word is in the static update list, then at step 120, the misspelled word is replaced with the correctly spelled word.

FIG. 2 shows what happens to a document when the static update list is used. Document 205 is a document in which the user has typed a misspelled word that is in the static update list. In document 205, the misspelled word is "teh." Note that the cursor is positioned directly after the word. The editing program cannot be certain that the word is completed until after the user has typed a space or some other symbol that ends the word. Once the user types a space, the editing program checks to see if the word is in the static update list. Since the word "teh" is in the static update list, the editing program automatically replaces the word "teh" with the correctly spelled word "the."

FIG. 2 also shows what happens to a document when the misspelled word is not in the static update list. In document 215, the user has just typed the word "copmany," which is misspelled. But because the word "copmany" is not in the static update list, the editing program cannot automatically correct the misspelling in document 220. In this case, the editing program informs the user that a misspelled word has been found, for example, by placing wavy line 225 underneath the misspelled word.

FIG. 3 shows a static update list as used for spell checking in the prior art. In FIG. 3, static update list 305 includes pairs of words. One entry in each pair is a misspelled word. The other entry is the correct spelling for the misspelled word in the first entry. For example, pair 310 includes misspelled word "teh" 315 and correctly spelled word "the" 320. Often, editing programs include pre-built static update lists, which include commonly misspelled words, as shown in FIG. 3.

Spell checking increases a user's productivity by allowing the user to know more quickly about mistakes in his/her document. But the user is still required to manually update the dictionary and static update lists. Where a user repeatedly makes the same typing mistakes that are not already in the static update list, the user must interrupt his/her typing to add new words to the static update list.

Accordingly, a need remains for a method and apparatus that helps a user update an automatic spell checker.

SUMMARY OF THE INVENTION

The invention provides a method and software for automatically updating a spell checking static update list by watching the user's typing and learning what words the user intended. When the user enters a word in a document, the word is scanned. If the word is misspelled, a static update list is checked to see if the misspelled word has an automatic correction (i.e., a corresponding correct word). If the misspelled word is not in the static update list and the user corrects the misspelling, the misspelled word and the correction word are both captured as a word pair in a dynamic update list. If the user corrects the misspelling a sufficient number of times, the static update list can itself be dynamically updated to recognize the correction regularly entered by the user.

The foregoing and other features, objects, and advantages of the invention will become more readily apparent from the following detailed description, which proceeds with reference to the accompanying drawings.

BRIEF DESCRIPTION OF THE DRAWINGS

FIGS. 9A and 9B show data structures for the dynamic update module of FIG. 5.

DETAILED DESCRIPTION OF THE PREFERRED EMBODIMENT

Figure 1:
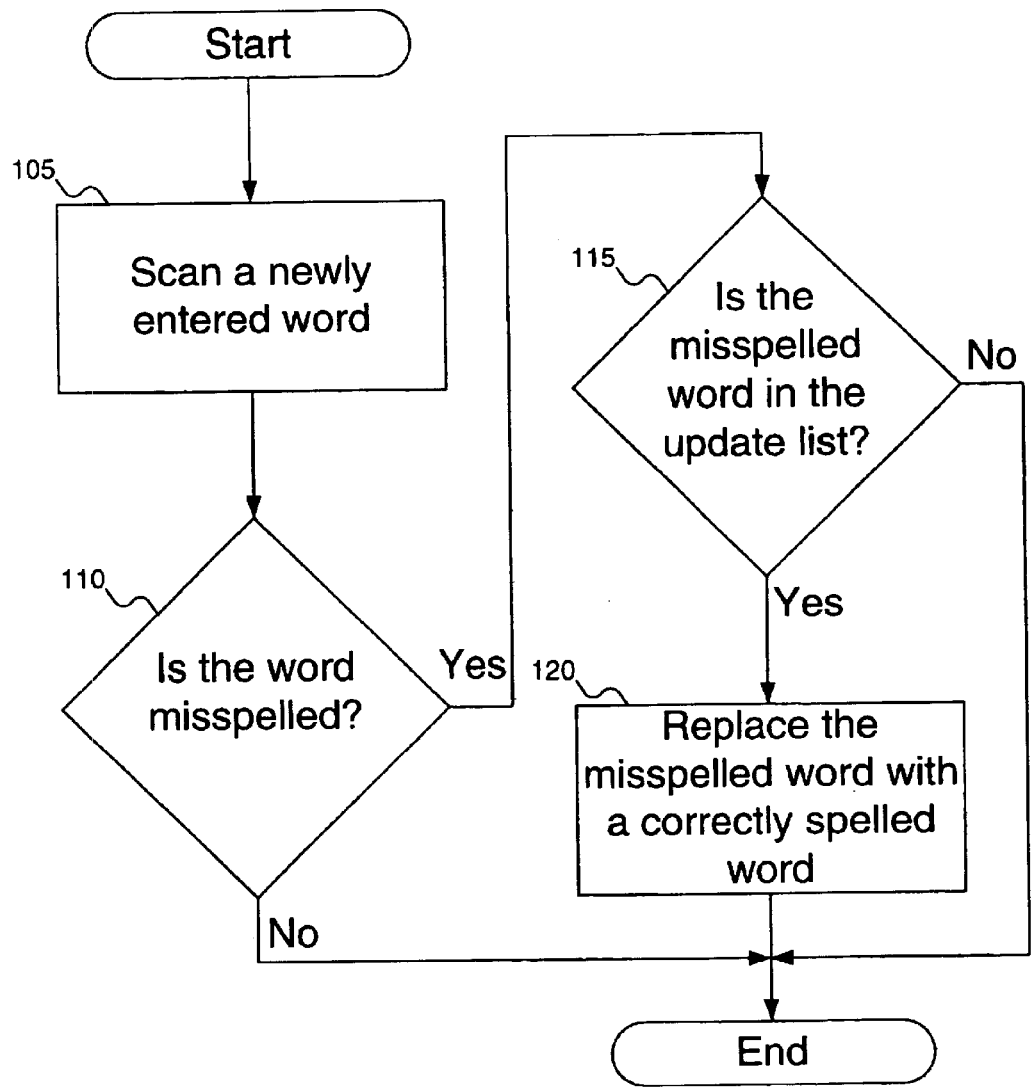
FIG. 1 is a flowchart of how a static update list is used in the prior art.
Figure 2:
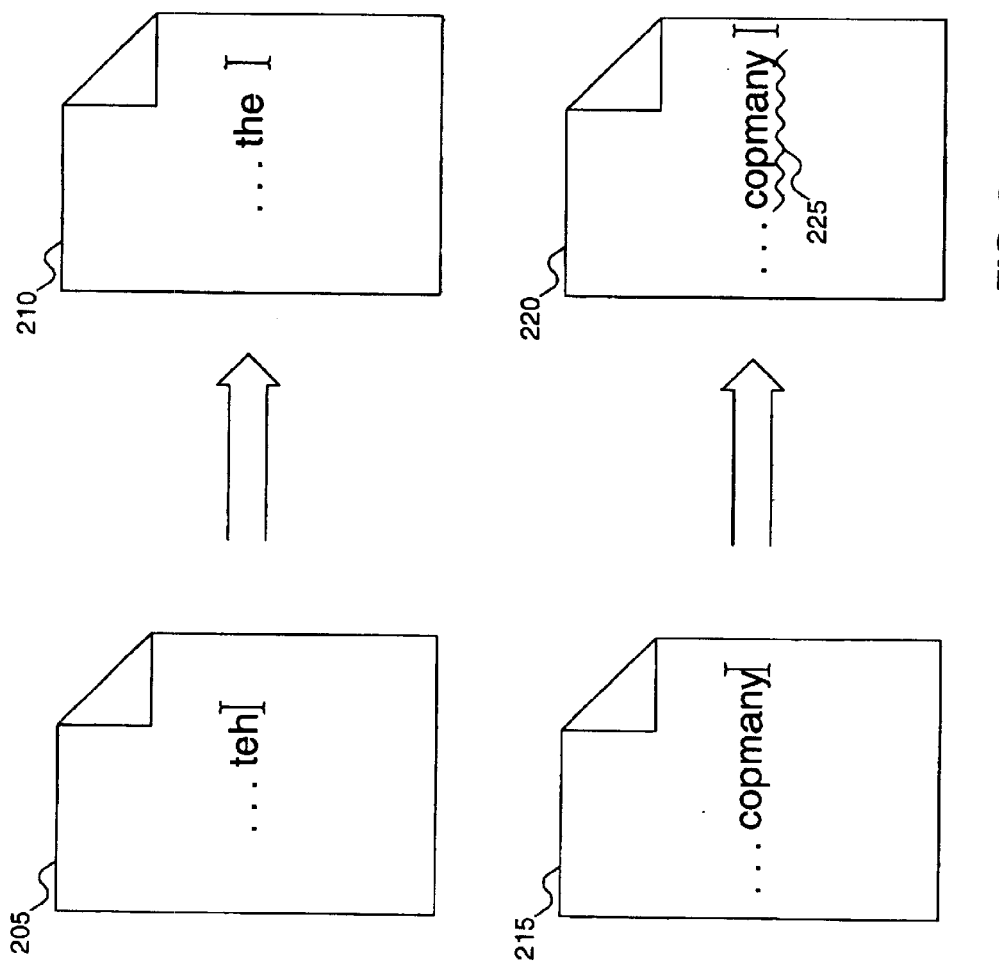
FIG. 2 shows how static update lists are used in the prior art to automatically correct misspelled words.
Figure 3:
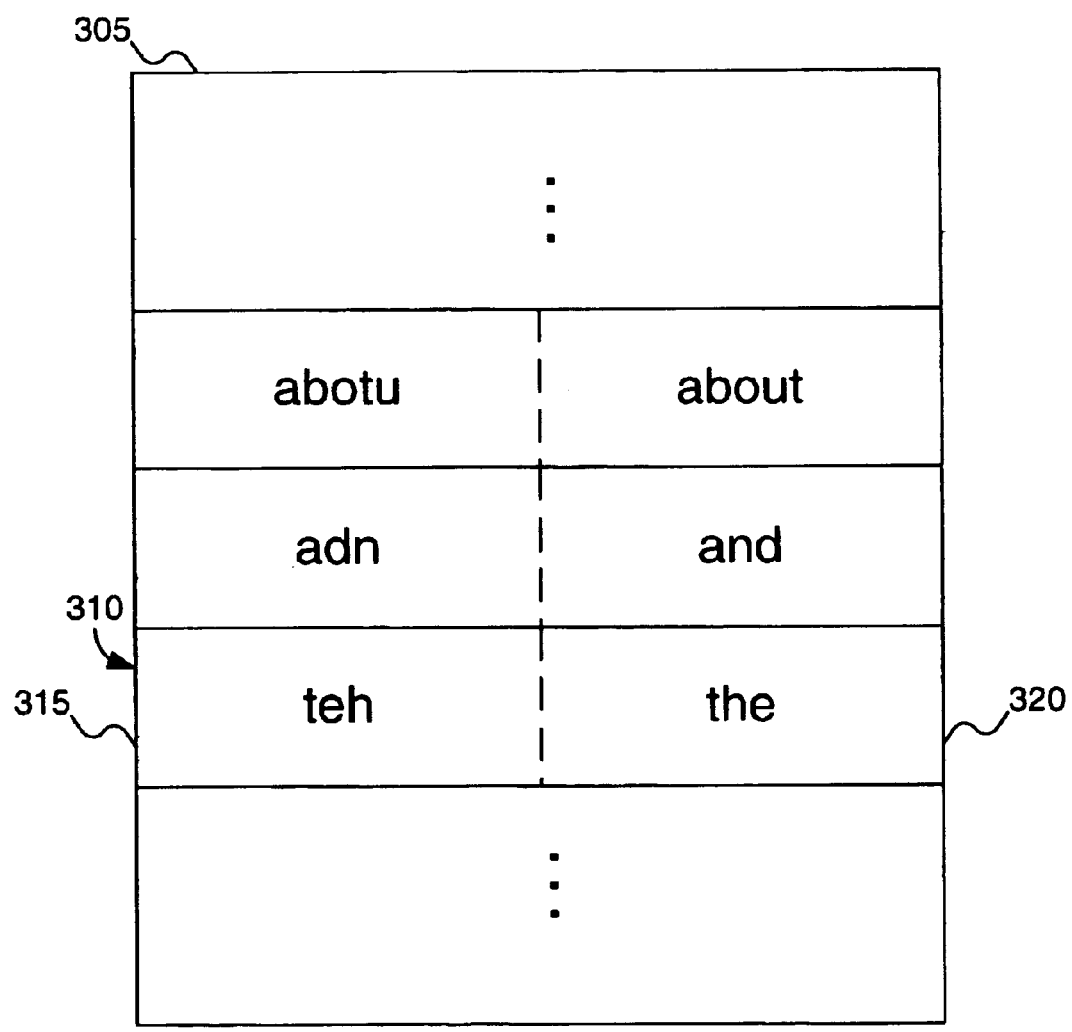
FIG. 3 shows an update list according to the prior art.
Figure 4:
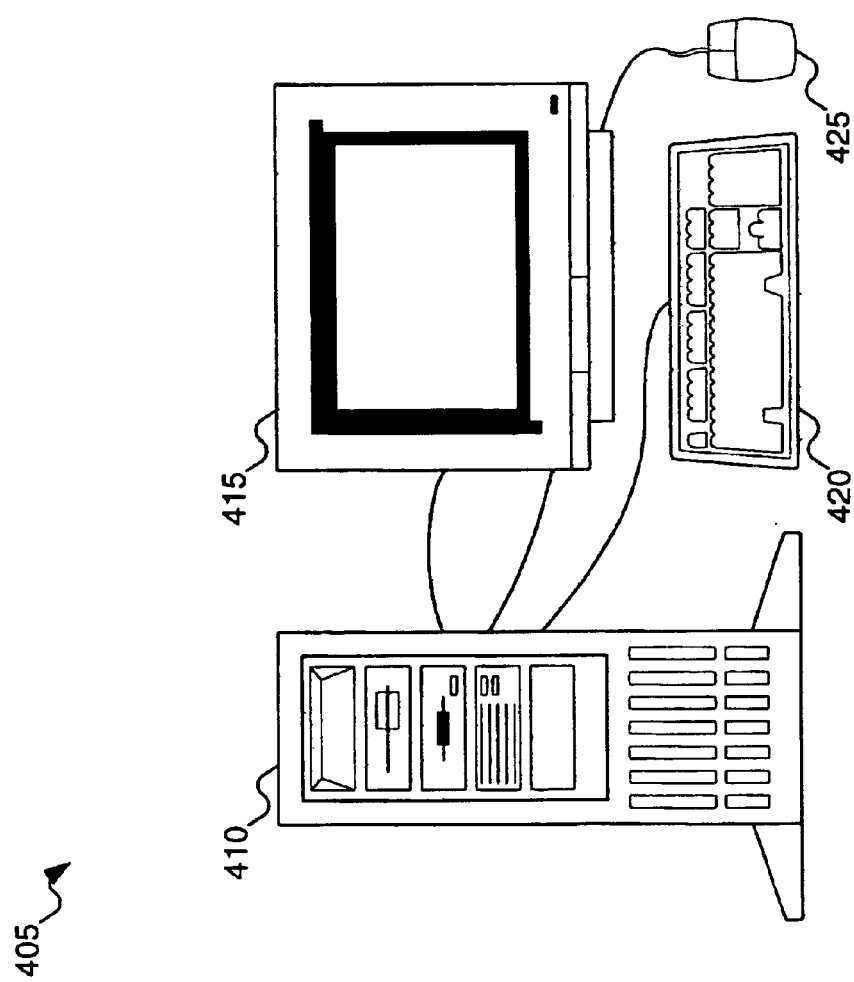
FIG. 4 shows a computer system on which the invention can be implemented.

FIG. 4 shows a computer system 405 on which a dynamic update list for spell checking can operate according to the invention. Computer system 405 conventionally includes a computer 410, a monitor 415, a keyboard 420, and a mouse 425. Optional equipment not shown in FIG. 4 can include a printer and other input/output devices. Also not shown in FIG. 4 are the internal components of computer system 405: e.g., a central processing unit, memory, file system, etc.

Figure 5:
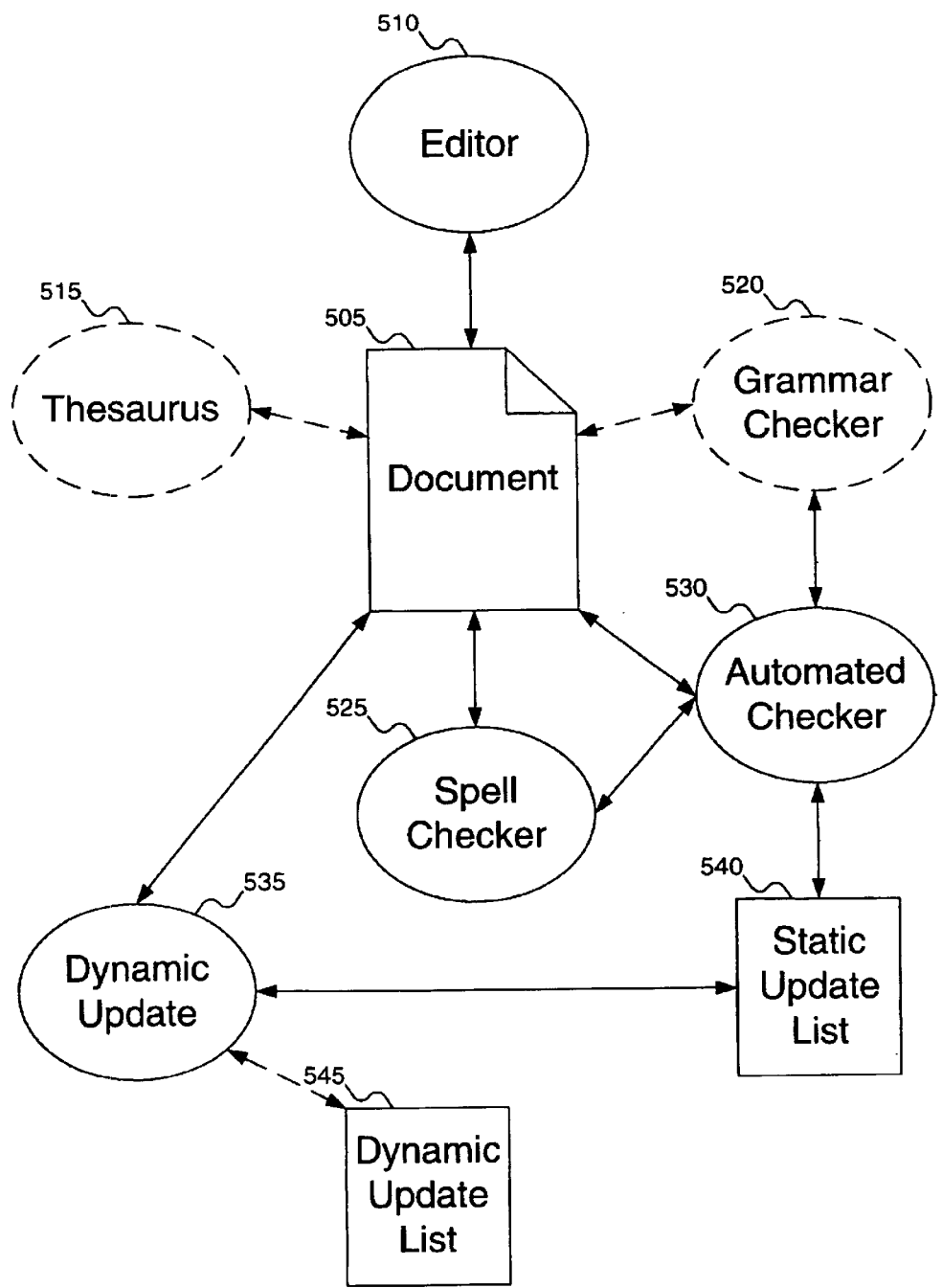
FIG. 5 shows a dynamic update module according to the invention interacting with other modules in software for spell checking an edited document.

FIG. 5 shows a dynamic update module interacting with other modules in an edited document. In FIG. 5, document 505 is being edited by editor 510. Although in the preferred embodiment editor 510 is a word processing program, a person skilled in the art will recognize that other editors exist. Many other programs include editing modules: e.g., spreadsheets, database management systems, and schedulers include basic editors that can include spell checking capabilities. For the remainder of this document, however, it is assumed that the editor in question is part of a word processing program.

Other modules that can operate on document 505 are thesaurus 515, grammar checker 520, spell checker 525, and automated checker 530. Thesaurus 515 provides the user with synonyms of words in document 505. Grammar checker 520 checks document 505 for proper grammar, informs the user when possible grammar errors exist, and presents the user with correct grammar. Spell checker 525 checks document 505 for proper spelling, informs the user of misspelled words, and presents the user with correct spelling options. Automated checker 530 performs automatic spelling correction (and in an alternate embodiment grammar checking as well) on document 505 by comparing words entered by the user with static update list 540. When a word is matched with a word in static update list 540, automated checker replaces the misspelled word with the correction in static update list 540.

Dynamic update 535 watches document 505. When the user enters a misspelled word which automated checker 530 does not automatically correct, dynamic update 535 checks to see if the user corrects the misspelling. If the user corrects the misspelling, dynamic update 535 checks to see if the user has misspelled the word before and corrected it in the same way. If the user has made the misspelling and correction before, dynamic update 535 increments a count of the number of times the user has made the mistake and corrected it in dynamic update list 545. Otherwise, a second update unit within dynamic update 535 adds the misspelled word and its correction as entered into the document using the document editor program to dynamic update list 545 for future reference.

It may happen that the misspelled word is included in static update list 540. If the correction in static update list 540 does not satisfy the user, the user can overrule the correction with an alternate correction. Dynamic update 535 can then add the misspelled word and the alternate correction to dynamic update list 545 for later use.

If the user has made a mistake and corrected it a threshold number of times, a first update unit within dynamic update 535 moves the misspelled word and its correction from dynamic update list 545 to static update list 540. Then, when the user makes the same misspelling in the future, automated checker 530 will automatically correct the misspelling for the user. In the preferred embodiment, dynamic update 535 tracks the number of times the user has misspelled a word in a particular way and has corrected the misspelling to a particular correct spelling. However, a person skilled in the art will recognize that any measure indicating the correction is worth adding to static update list 540 can be used in place of a threshold count. For example, the measure indicating the correction is worth adding to static update list 540 can be a count of how many times the user has typed the correctly spelled word. If the user has typed the correctly spelled word enough times, the static update list can be updated based on only one misspelling by the user. Or the measure can be an examination of how frequently the correctly spelled the word has been entered relative to the number of words typed by the user. If the user enters the correctly spelled word enough times in a single paragraph (or page, document, or multiple documents), the static update list can be updated.

Before dynamic update 535 changes static update list 540, dynamic update 535 should check static update list 540 to see if static update list 540 has the misspelled word already in it, with an alternate correction. If static update list 540 includes a correction for the misspelled word, dynamic update 535, will not change static update list 540. In another embodiment, dynamic update 535 informs the user that two corrections are possible for the misspelled word, and lets the user select the preferred correction. Then, dynamic update 535 updates static update list 540 according to the user's preference.

In the preferred embodiment, dynamic update 535 is implemented in software. Thus, both the maintenance of dynamic update list 545 and the update of static update list 540 are done via software. However, a person skilled in the art will recognize that other implementations are possible, depending on the situation. For example, specially constructed hardware implementing a special purpose machine can include a hardware unit implementing the functions of dynamic update 535.

Figure 6:
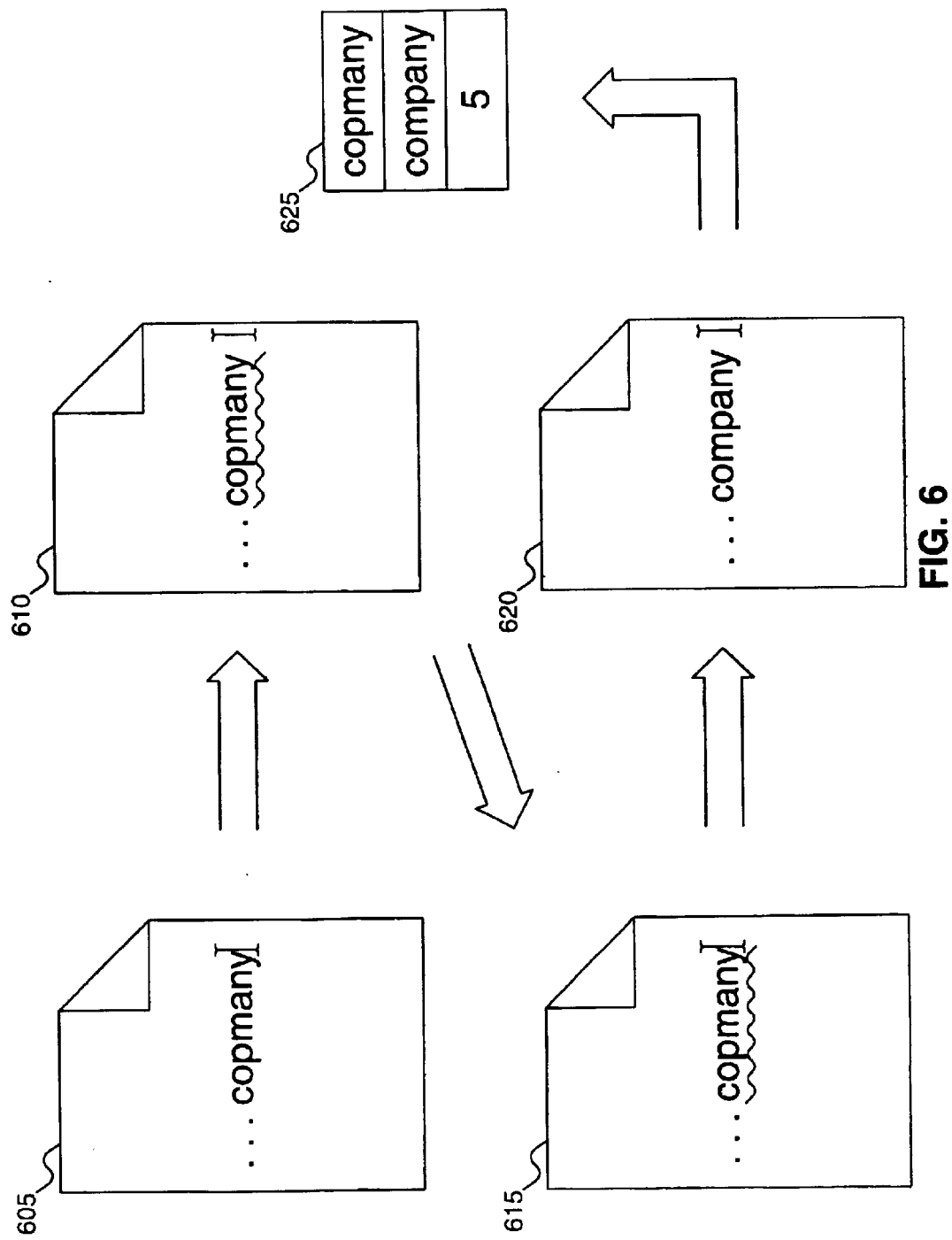
FIG. 6 shows a document being edited by a user using a dynamic update module according to FIG. 5 in a preferred embodiment.

FIG. 6 shows a document being edited by a user using a dynamic update module according to FIG. 5 in a preferred embodiment. Document 605 shows the user typing the word "company." In document 605, the user has misspelled the word "company" as "copmany." In document 610, the automated checker has checked the word, determined that it is misspelled, and also determined that the misspelled "copmany" is not in the static update list. In document 615, the user has started to correct the spelling of "copmany." In document 620, the user has completed correcting the word "company." Finally, entry 625 in the dynamic update list is incremented to show that the user has misspelled and corrected "company" five times.

Figure 7:
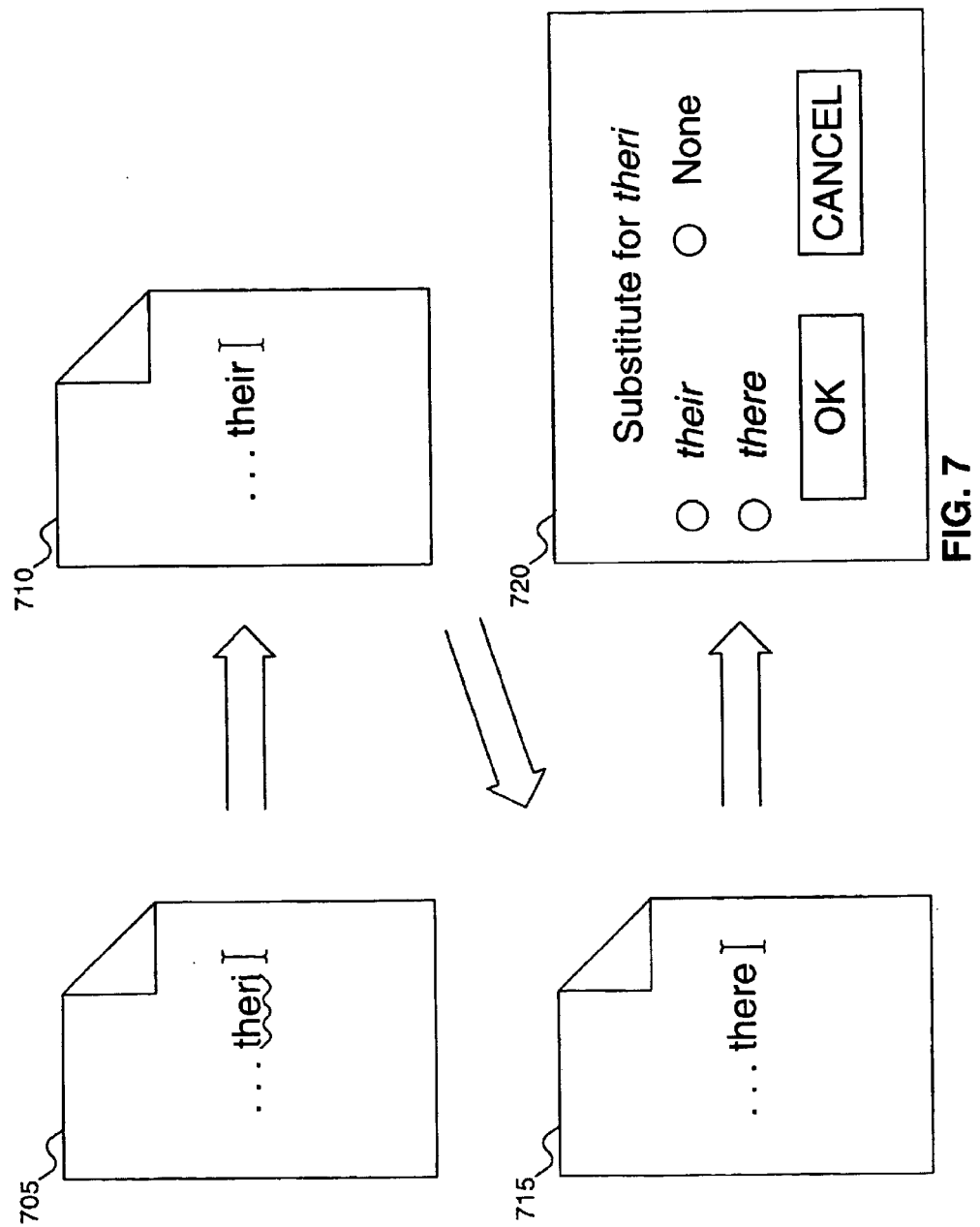
FIG. 7 shows a document being edited by a user using a dynamic update module according to FIG. 5 in a second embodiment.

FIG. 7 shows a document being edited by a user using a dynamic update module according to FIG. 5 in a second embodiment. Document 705 shows the user typing the word "there," but misspelling the word as "their." In document 710, the automated checker has checked the word, determined that it is misspelled, and automatically corrected the word as "their." In document 715, the user has changed the correction from "their" to "there." Because the misspelled word was already in the static update list of the automated checker, the dynamic update module presents the user with both the original correction alternative and the user's alternate correction. The user then has the option of keeping the original correction in the static update list, replacing the original correction with the user's alternate correction, or having no automatic correction for the misspelling "their."

Figure 8:
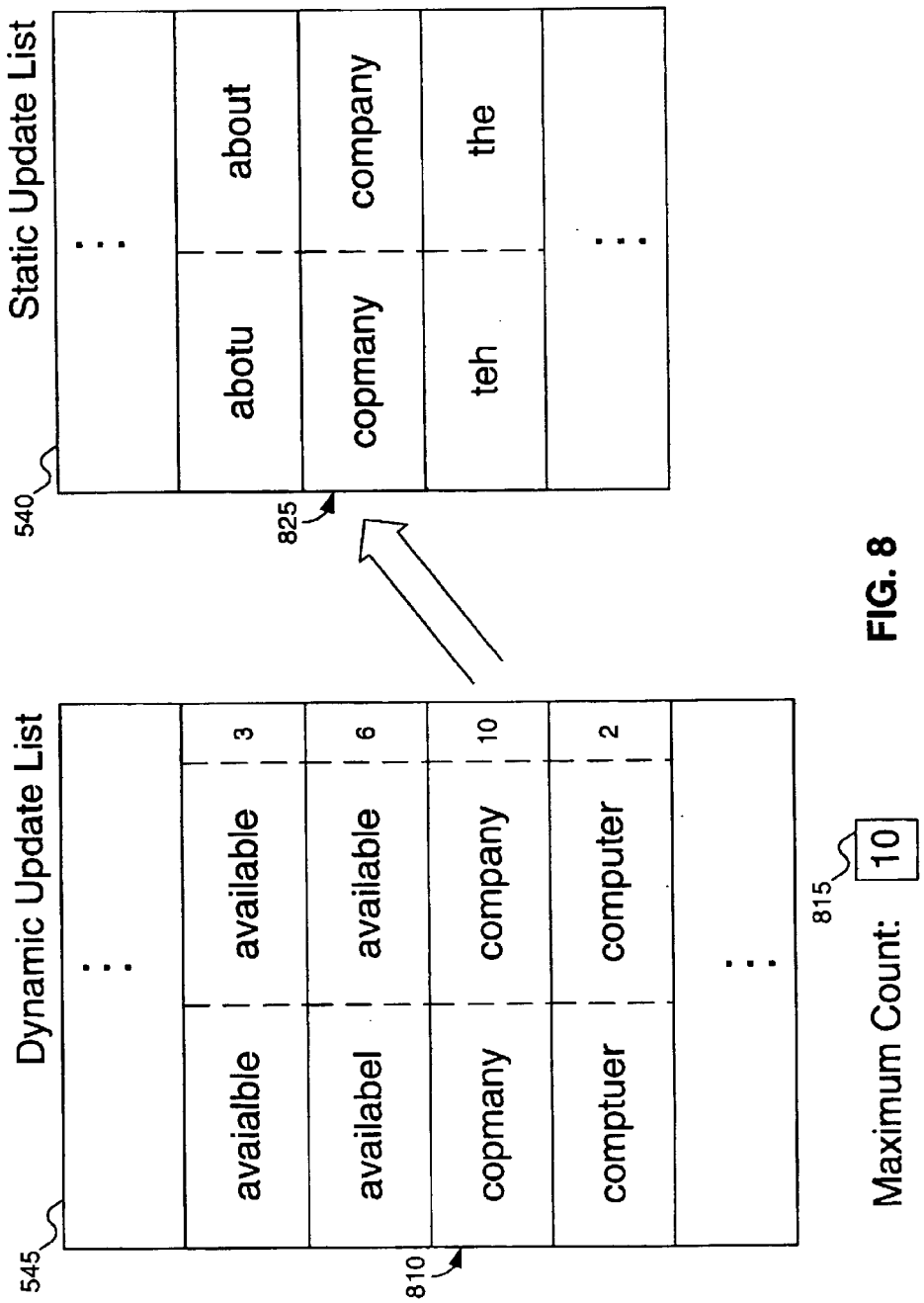
FIG. 8 shows the dynamic update list being used to update the static update list according to the invention.

FIG. 8 shows the dynamic update list being used to update the static update list. In FIG. 8, dynamic update list 545 has pairs of words as entries where the user has corrected misspelled words. Entry 810 in dynamic update list 545 has been corrected by the user 10 times. As the user has set the threshold maximum count 815 at 10, the pair consisting of misspelled word "copmany" and the correct spelling "company" should now be added to static update list 540. (Note that the invention enables the user to set threshold maximum count 815 at her desired level: if desired, the user can set threshold maximum count 815 at a higher or lower level.) Entry 825 in static update list 540 is added automatically by the dynamic update module.

Figure 9B:
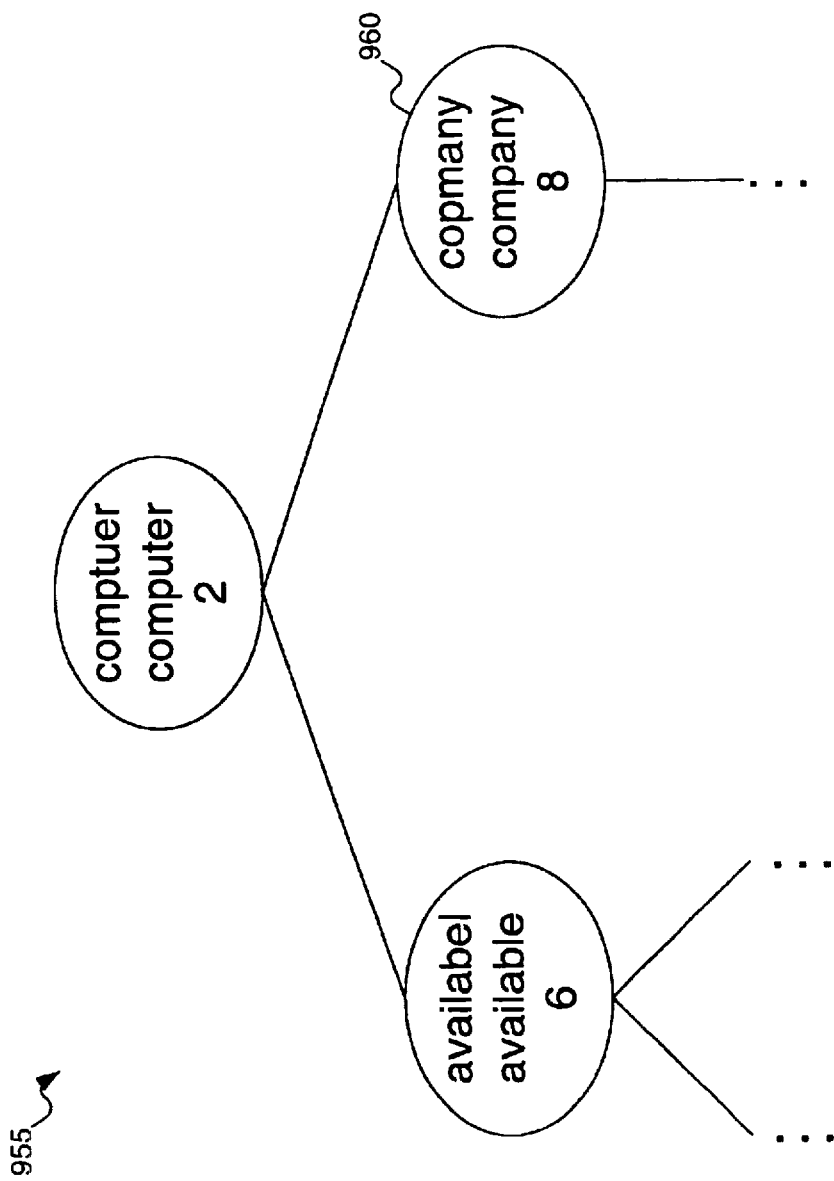

FIGS. 9A and 9B show alternative data structures for the dynamic update module of FIG. 5. In FIG. 9A the entries in the dynamic update module are organized as a list 905. In list 905, the first element in each entry is the misspelled word. The second element in each entry is the corrected spelling of the misspelled word. The third element is a count of the number of times the word has been misspelled and corrected. For example, entry 910 includes misspelled word "copmany" 915, which the user has corrected to correctly spelled word "company" 920 eight times according to counter 925.

FIG. 9B shows the entries in the dynamic update module organized as a tree. Tree 955 is a sorted tree, where elements to the left of a node come alphabetically before the node, and elements to the right of the node come alphabetically after the node. Although tree 955 is a very basic tree, a person skilled in the art will recognize that more complicated tree structures can be used: for example, B-trees and other tree structures that allow for simple insertion, deletion, and searching of the tree. Node 960 contains the same information as entry of 910 of FIG. 9A.

Figure 10A:
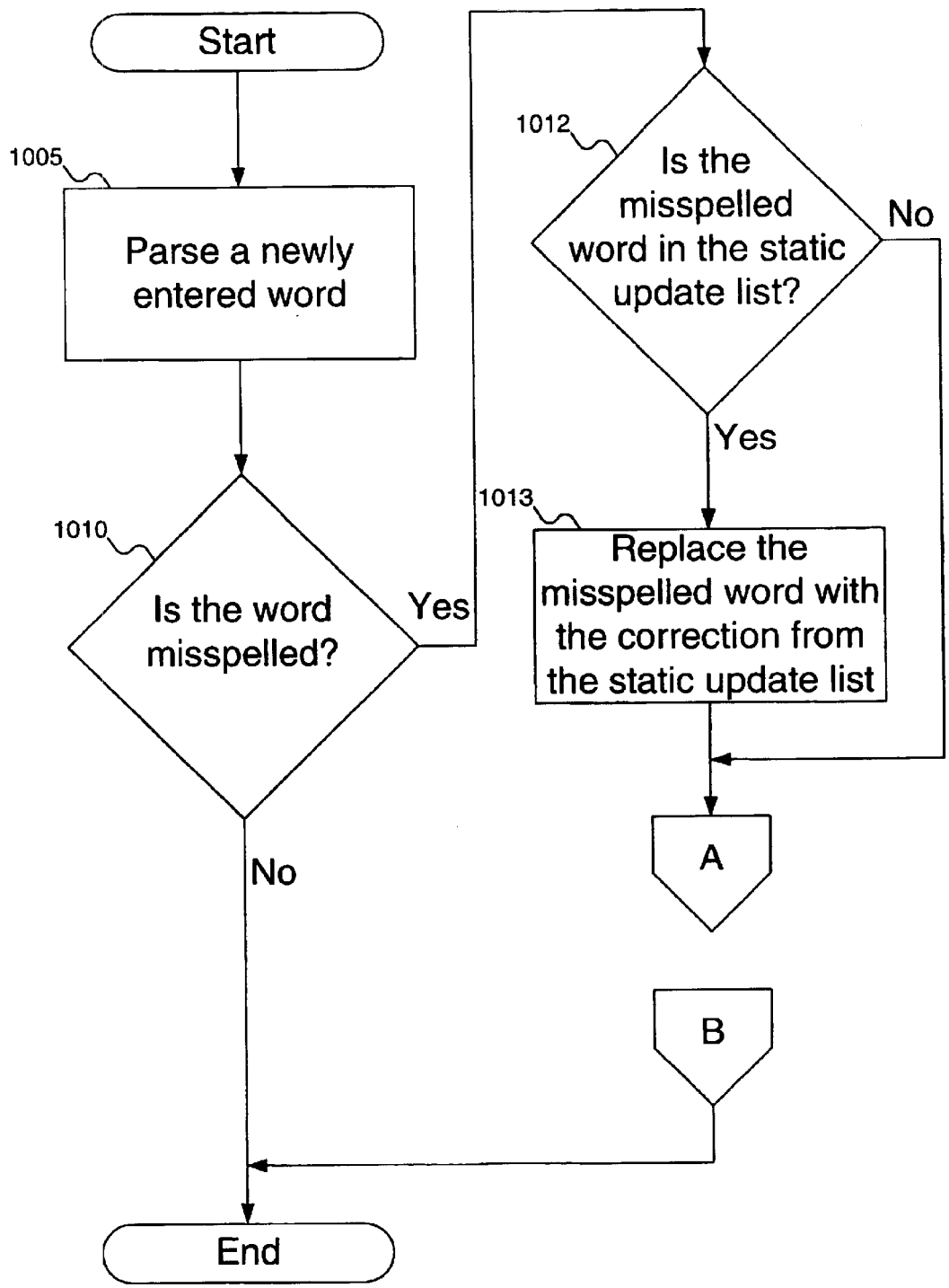
FIGS. 10A and 10B show a flowchart of-the method for maintaining the dynamic update list in the preferred embodiment.
Figure 10B:
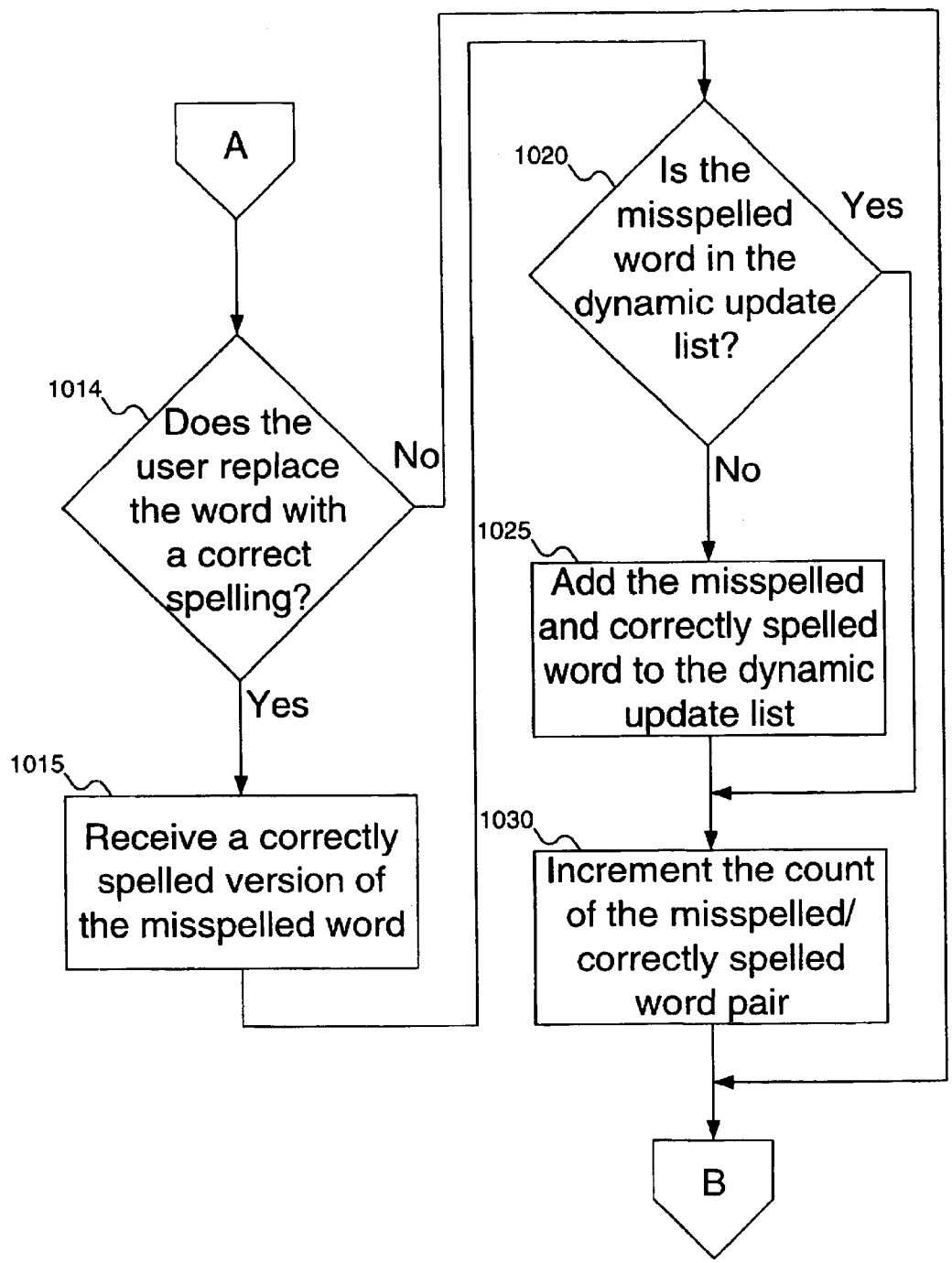

FIGS. 10A and 10B show a flowchart of the method for maintaining the dynamic update list 545 in the preferred embodiment. At step 1005, a word is parsed. At step 1010, the word is checked to see if it is-misspelled. If the word is misspelled, then at step 1012 the static update list is checked to see if the misspelled word is listed. If the misspelled word is in the static update list, then at step 1013 the misspelled word is replaced with the correct spelling of the word from the static update list. At step 1014, the system checks to see if the user replaces the word with a correct spelling. Note that this can happen even if the misspelled word was replaced with a word from the static update list: the static update list may have replaced the misspelled word with a correction other than that desired by the user. At step 1015 the correct spelling of the misspelled word is received. At step 1020 the dynamic update list is checked to see if the misspelled word and its correct spelling are already in the dynamic update list. Note that the dynamic update list stores the correction of the misspelled word, even if the misspelled word was corrected from the static update list. If the misspelled word and its correct spelling are not in the dynamic update list, then at step 1025 the misspelled word and the correct spelling are added to the dynamic update list. Then, at step 1030 the count of the misspelled word and its correction are incremented.

Figure 11:
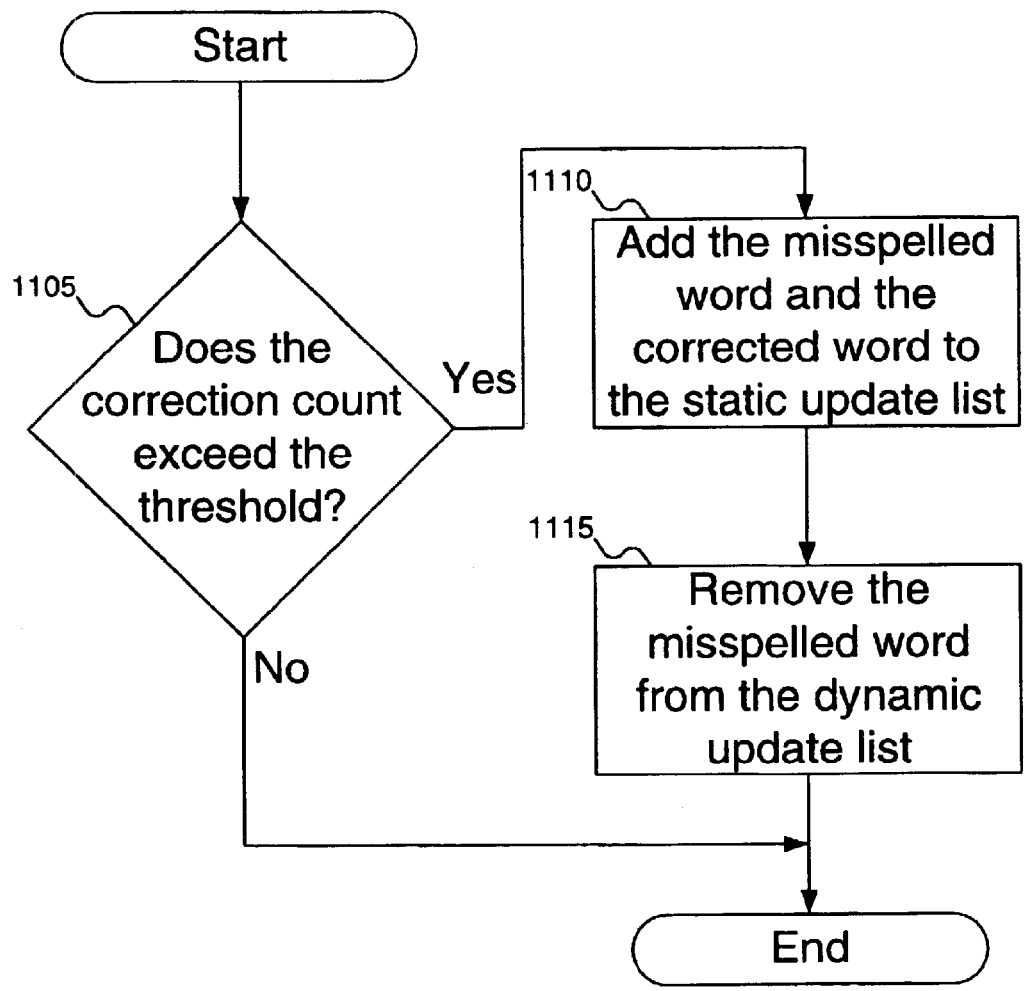
FIG. 11 is a flowchart of the method for updating the static update list by the dynamic update module as shown in FIG. 8.

FIG. 11 is a flowchart of the method for updating the static update list by the dynamic update module. At step 1105, the dynamic update module checks to see if the correction count of any entry in the dynamic update list exceeds the threshold count. If the threshold count is exceeded, then at step 1110, the misspelled word and its correction are added to the static update list, and at step 1115, removed from the dynamic update list.

Figure 12:
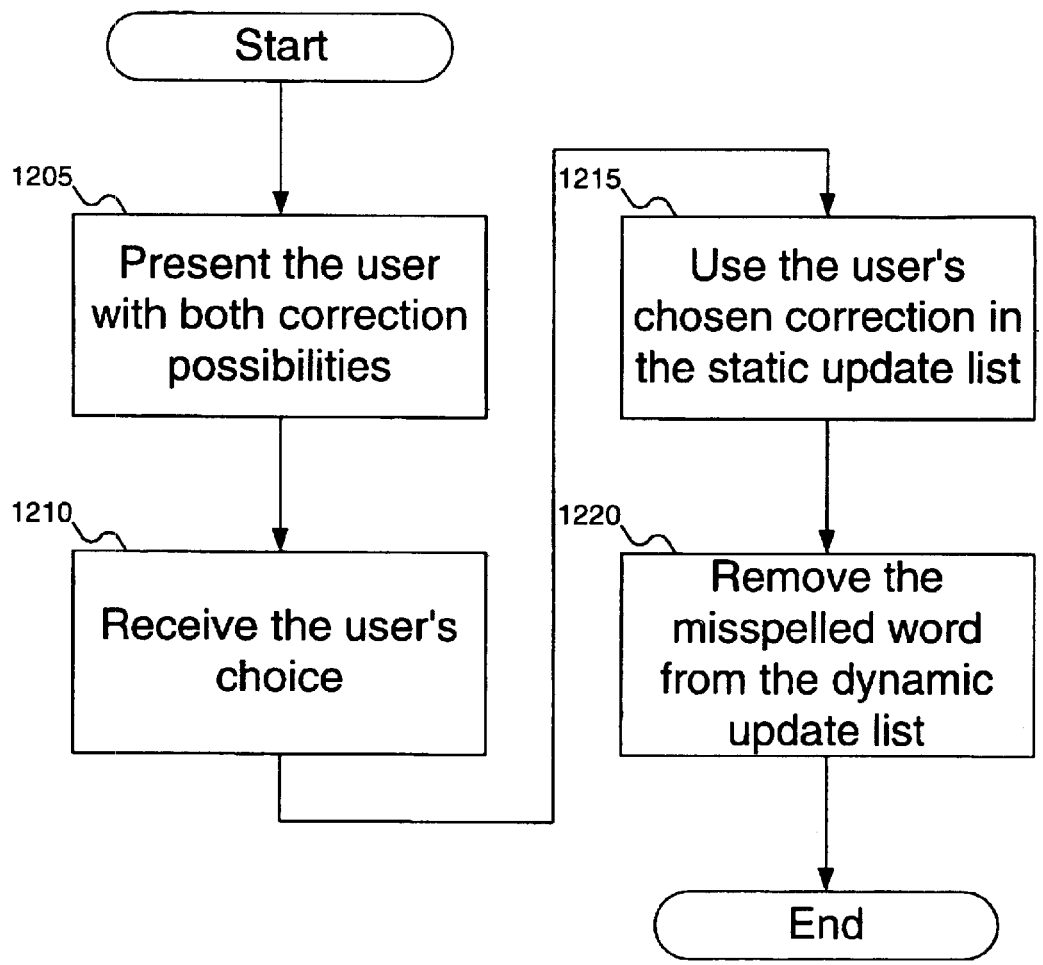
FIG. 12 is a flowchart of the method for a user to select between alternative corrections of a misspelled word in the present invention.

FIG. 12 is a flowchart of the method for a user to select between alternative corrections of a misspelled word. At step 1205, the user is presented with the alternative correct spellings for the misspelled word. In the preferred embodiment, the user is presented the alternative correct spellings in a dialog box. At step 1210, the user selects the desired correct spelling for the static update list. At step 1215, the static update list is updated with the misspelled word and the user's chosen correct spelling. Finally, at step 1220, the misspelled word is removed from the dynamic update list.

EXTENSIONS

A person skilled in the art will recognize that there are many possible extensions of this invention. Some extensions included in this invention are as follows:

Document formatting. Many users repeatedly format documents to their tastes. Such formatting includes choosing a new paper size, changing margins and fonts, inserting headers and; footers, and the like. By observing how users format their documents, the invention can aid the user, either by modifying a template on which document formatting is based, or by automatically updating document formats after the user begins the formatting process. The invention can also maintain a list of different formats, and let the user select the desired format from the list.

A, Other language support. Although the preferred embodiment discloses the use of the English language, the invention is equally applicable to foreign languages. Further, the invention can determine a frequency of the misspelled words for the user. If the user is typing a document in which the misspelling frequency substantially exceeds the user's norm, the invention can conclude that the document is being generated in another language, and can start comparing "misspelled" words in the document with other language dictionaries. This extension is especially useful where the user has used foreign language dictionaries before.

Multilingual support. Some users can be expected to be multi-lingual, and will generate documents that can be either monolingual (entirely in one language) or multilingual (in more than one language). The invention can maintain multiple dynamic update lists for the user, including every combination of languages in which the user generates documents. This avoids corrections being made that are valid in one language but not in another language.

Multi-word corrections. Although in the preferred embodiment the space character is treated as a word delimiter, it can also be treated as a regular character. Then, if the user makes a correction across a space, the dynamic update list can capture this correction and eventually add it to the static update list. For example, if the user types "mor ethan" and then corrects the phrase to "more than," this multi-word correction can be identified.

Word completion. In an alternate embodiment, the dynamic update list can update the static update list with word completions. The dynamic update list takes a properly spelled word, such as "explanation," and reduces it to a partial word "expl." If the user completes the partial word "expl" as "explanation" a sufficient number of times, the static update list can the receive the pair "expl" and "explanation," allowing the user to short-hand his/her typing. Word completion can be very useful in functional documents, where a particular phrase must be entered multiple times.

Pick lists. In an alternate embodiment, the static update list can store more than one possible misspelling correction. For example, the static update list can store both "their" and "there" as correct spellings for "their." The static update list can then correct a misspelling based on language context. In another embodiment, a pick list (a list of wordscan pop up, either after the misspelling is determined or by user selection, from which the user can select the desired word.

Markov processes. A Markov process is a mapping from one state to a list of second states, each second state having a positive probability, and the sum of the probabilities for all second states being one. Given the input state, the Markov process can "guess" at the subsequent state. In the context of the invention, a Markov process can be used to "guess" the correct spelling of a misspelled word based on the frequencies with which the user has corrected the misspelling to an alternate spelling. For example, if the user types "theri," the user has corrected this misspelling to "their" 60% of the time, and the user has corrected this misspelling to "there" 40% of the time, the Markov process can "guess" with 60% certainty that the user intended "their." Each time the user corrects a misspelling, the probabilities can be updated, affecting the probabilities of the Markov process. Markov processes also combine well with pick lists and word completion.

Multi-user support. Many computers are used by only a single user. But some computers are used by more than one user. Static and dynamic update lists can be maintained for each user, providing each user with individual typing biases and correction preferences.

Multiple dynamic update lists. In the preferred embodiment, a single dynamic update list is used for updating the static update list for a single user (assuming one user per computer; see multi-user support above). This means that dynamic update lists are maintained across multiple documents for an individual user. But dynamic update lists can be tied to particular documents.

Different thresholds. In the preferred embodiment, a counter is used to track how many times the user has entered a particular misspelled word and corrected it. But, as discussed above, other thresholds can be used to determine if the correction should be added to the static update list. For example, the static update list can be updated if the user types the correctly spelled word enough times, even if the user misspelled the word only once. Or the threshold can be set based on the frequency with which the user types the misspelling relative to the number of words in the document. The user can be allowed to choose her desired threshold technique, and can also be allowed to choose when the threshold is considered reached.

Having illustrated and described the principles of our invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for updating a static update list of pairs of misspelled and correctly spelled words in a document with a spell checking program on a computer, the method executed by the computer and comprising:

parsing a misspelled word as entered into the document;
verifying that the misspelled word is not spelled correctly;
receiving a corrected spelling of the misspelled word;
incrementing a count of a number of times the misspelled word has been parsed and the corrected spelling of the misspelled word received: and
updating the static update list of pairs of misspelled and correctly spelled words by the computer to include the misspelled word and the corrected spelling of the misspelled word if the count exceeds a threshold greater than one.

2. A method according to claim 1, wherein updating the static update list of pairs of misspelled and correctly spelled words includes storing the misspelled word, the corrected spelling of the misspelled word, and the count in a dynamic update list.

3. A method according to claim 2, wherein updating the static update list of pairs of misspelled and corrected spellings of the misspelled words further includes updating the static update list of pairs of misspelled and correctly spelled words from the dynamic update list.

4. A method according to claim 1, wherein verifying that the misspelled word is not spelled correctly includes finding that the misspelled word is not in the static update list of pairs of misspelled and correctly spelled words.

5. A method according to claim 1, wherein receiving a corrected spelling includes:

receiving from the user a deletion of the misspelled word from the document; and
receiving from the user an entry of the corrected spelling of the misspelled word into the document.

6. A method according to claim 1, wherein updating the static update list of pairs of misspelled and correctly spelled words includes replacing an alternate corrected spelling of the misspelled word in the static update list with the corrected spelling of the misspelled word.

7. A method according to claim 1, wherein incrementing a count includes initializing the count to one if the misspelled word has not been parsed before and the corrected spelling of the misspelled word not received before.

8. A computer-readable medium containing a program to update a static update list of misspelled and correctly spelled words in a document with a spell checking program on a computer, the program executable by the computer and comprising:

parsing software to parse a misspelled word as entered into the document;
verification software to verify that the misspelled word is not spelled correctly;
first reception software to receive a corrected spelling of the misspelled word;
incrementing software to increment a count of a number of times the misspelled word has been parsed and the corrected spelling of the misspelled word received: and
updating software for the computer to update the static update list of misspelled and correctly spelled words to include the misspelled word and the corrected spelling of the misspelled word if the count exceeds a threshold greater than one.

9. A computer-readable medium containing a program according to claim 8, wherein the updating software includes replacement software to replace an alternate corrected spelling of the misspelled word in the static update list with the corrected spelling of the misspelled word.

10. A computer-readable medium containing a program according to claim 9, wherein the updating software further includes:

presentation software to present a user with a choice of the corrected spelling of the misspelled word and the alternate corrected spelling of the misspelled word as the correction for the misspelled word;

second reception software to receive from the user a selected correction word; and substitution software to substitute the selected correction word for the alternate correctly spelled word in the static update list.

11. A computer-readable medium containing a program according to claim 10, wherein:

the presentation software includes display software to display a dialog box on screen; and the second reception software includes reception software to receive a selection in the dialog box from the user.

12. A computer-readable medium containing a program according to claim 10, wherein:

the second reception software includes third reception software to receive from the user the rejection of both the correctly spelled word and the alternate correctly spelled word; and the substitution software includes removal software to remove the misspelled word and both the correctly spelled word and the alternate correctly spelled word from the static update list.

13. A computer-readable medium containing a program according to claim 8, wherein the verification software includes finding software to find that the misspelled word is not in the static update list of pairs of misspelled and correctly spelled words.

14. A computer-readable medium containing a program according to claim 8, wherein the reception software includes:

fourth reception software to receive from the user a deletion of the misspelled word from the document; and fifth reception software to receive from the user an entry of the corrected spelling of the misspelled word into the document.

15. A computer-readable medium containing a program according to claim 8, wherein the updating software includes storage software to store the misspelled word, corrected spelling of the misspelled word, and the count in a dynamic update list.

16. A computer-readable medium containing a program according to claim 8, wherein the incrementing software includes initialization software to initialize the count to one if the misspelled word has not been parsed before and the corrected spelling of the misspelled word not received before.

17. An apparatus for correcting misspelled words in a document, the apparatus comprising:

a computer;

a document editor program executable on the computer;

a spell-checking program executable on the computer in conjunction with the document editor program;

a static update list of pairs of first misspelled and known correctly spelled words, the static update list stored on the computer; and a dynamic update list, the dynamic update list stored on the computer and including pairs of second misspelled words and possibly correctly spelled words and a count for each pair of a number of times the second misspelled word has been parsed and the possibly correctly spelled word has been received.

18. An apparatus according to claim 17, the apparatus further comprising an incrementer incrementing the counts of the dynamic update list.

19. An apparatus according to claim 17, the apparatus further comprising a first update unit for the computer to update the static update list from the dynamic update list.

20. An apparatus according to claim 19, wherein:

the apparatus further comprises a threshold greater than one; and the first update unit is operative to update the static update list from the dynamic update list when a count for a pair of second misspelled words and possible correctly spelled words exceeds the threshold.

21. An apparatus according to claim 17, the apparatus further comprising a second update unit for updating the dynamic update list from the document editor program.

22. A computer-readable medium containing a program, the program comprising:

a spell-checking program executable on a computer;

means for maintaining a static update list of pairs of first misspelled and known correctly spelled words; and means for maintaining a dynamic update list of pairs of second misspelled words and possibly correctly spelled words and a count for each pair of a number of times the second misspelled word has been parsed and the possibly correctly spelled word has been received.

23. A computer-readable medium according to claim 22, the program further comprising means for incrementing the counts of the dynamic update list.

24. A computer-readable medium according to claim 22, the program further comprising means for updating the static update list from the dynamic update list.

* * * * *